(12) United States Patent
Long et al.

(10) Patent No.: US 8,332,334 B2
(45) Date of Patent: Dec. 11, 2012

(54) SYSTEM AND METHOD FOR CROSS DOMAIN LEARNING FOR DATA AUGMENTATION

(75) Inventors: Bo Long, Mountain View, CA (US); Belle Tseng, Cupertino, CA (US); Sudarshan Lamkhede, Santa Clara, CA (US); Srinivas Vadrevu, Milpitas, CA (US); Ya Zhang, Sunnyvale, CA (US)

(73) Assignee: Yahoo! Inc., Sunnyvale, CA (US)

( * ) Notice: Subject to any disclaimer, the term of this patent is extended or adjusted under 35 U.S.C. 154(b) by 575 days.

(21) Appl. No.: 12/566,270

(22) Filed: Sep. 24, 2009

(65) Prior Publication Data

US 2011/0071965 A1 Mar. 24, 2011

(51) Int. Cl.
*G06F 15/18* (2006.01)
(52) U.S. Cl. ............................................ 706/12; 706/42
(58) Field of Classification Search .................... 706/12, 706/46
See application file for complete search history.

(56) References Cited

OTHER PUBLICATIONS

Jiang et al ("Instance Weighting for Domain Adaptation in NLP" 2007.*
Jing Jiang ("A Literature Survey on Domain Adaptation of Statistical Classifiers" Mar. 2008).*
Ueffing et al ("Semi-supervised model adaptation for statistical machine translation" 2007).*
Zhu et al ("Adaptive Named Entity Recognition for Web Browsing" 2004).*
Jeong et al ("Improving Speech Recognition and Understanding using Error-Corrective Reranking" 2008).*
Zeshui Xu ("A method based on linguistic aggregation operators for group decision making with linguistic preference relations" 2003).*
Ando et al., "A High-Performance Semi-Supervised Learning Method for Text Chunking", In *Proceedings of the 43rd Annual Meeting on Association for Computational Linguistics*, Morristown, NJ, pp. 1-9, 2005.
Argyriou et al., "Multi-Task Feature Learning", *Advances in Neural Information Processing Systems: Proceedings of the 2006 Conference*, 8 pages, MIT Press, 2007.
Argyriou et al., "A Spectral Regularization Framework for Multi-Task Structure Learning", *Advances in Neural Information Processing Systems*, 20, 2008, 8 pages.
Bickel et al., "Discriminative Learning for Differing Training and Test Distributions", In *Proceedings of the 24th International Conference on Machine Learning*, ACM, Corvallis, Oregon, pp. 81-88, 2007.
Blitzer et al., "Learning Bounds for Domain Adaptation", *Advances in Neural Information Processing Systems*, vol. 20, 2008, 8 pages.

(Continued)

*Primary Examiner* — Lut Wong
(74) *Attorney, Agent, or Firm* — Berkeley Law & Technology Group, LLP

(57) ABSTRACT

According to an example embodiment, a method comprises executing instructions by a special purpose computing apparatus to, for labeled source domain data having a plurality of original labels, generate a plurality of first predicted labels for the labeled source domain data using a target function, the target function determined by using a plurality of labels from labeled target domain data. The method further comprises executing instructions by the special purpose computing apparatus to apply a label relation function to the first predicted labels for the source domain data and the original labels for the source domain data to determine a plurality of weighting factors for the labeled source domain data. The method further comprises executing instructions by the special purpose computing apparatus to generate a new target function using the labeled target domain data, the labeled source domain data, and the weighting factors for the labeled source domain data, and evaluate a performance of the new target function to determine if there is a convergence.

19 Claims, 3 Drawing Sheets

OTHER PUBLICATIONS

Blitzer et al., "Domain Adaptation With Structural Correspondence Learning" In *Proceedings of the 2006 Conference on Empirical Methods in Natural Language Processing* (Jul. 2006) (EMNLP), pp. 120-128, 2006.

Blum et al., "Combining Labeled and Unlabeled Data with Co-Training", In *Proceedings of the 11th Annual Conference on Computational Learning Theory*, ACM, Madison, Wisconsin, pp. 92-100, 1998.

Bonilla et al., "Multi-task Gaussian Process Prediction", In *Neural Information Processing Systems (NIPS)* 2007, Vancouver, BC, Canada. vol. 20, pp. 153-160, Dec. 3-6, 2007.

Dai et al., "Co-Clustering Based Classification for Out-Of-Domain Documents", In *Proceedings of the 13th ACM SIGKDD International Conference on Knowledge Discovery and Data Mining*, ACM, San Jose, CA, pp. 210-219, 2007.

Dai et al., "Boosting for Transfer Learning", In *Proceedings of the 24th International Conference on Machine Learning*, ACM, Corvallis, OR, pp. 193-200, 2007.

Daume, Hal, "Frustratingly Easy Domain Adaptation", In *Proceedings of the 45th Annual Meeting of the Association of Computational Linguistics* (Jun. 2007), pp. 256-263. vol. 45, 2007.

Daume, Hal, "Cross-Task Knowledge-Constrained Self Training", In *Proceedings of the 2008 Conference on Empirical Methods in Natural Language Processing*, Honolulu, HI, pp. 680-688, 2008.

Daume III et al., "Domain Adaptation for Statistical Classifiers", *Journal of Artificial Intelligence Research*, vol. 26, pp. 101-126, 2006.

Davis et al., "Deep Transfer Via Second-Order Markov Logic", AAAI Workshop: Transfer Learning for Complex Tasks, 2008, 6 pages.

Evgeniou et al., "Regularized Multi-Task Learning", In *Proceedings of the Tenth ACM SIGKDD International Conference on Knowledge Discovery and Data Mining*, KDD '04, Seattle, WA, pp. 109-117, Aug. 22-25, 2004.

Friedman, Jerome H., "Greedy Function Approximation: A Gradient Boosting Machine", *Annals of Statistics*, vol. 29, No. 5, pp. 1189-1232, Apr. 2001.

Heckman, James J., "Sample Selection Bias As a Specification Error", *Econometrica: Journal of the Econometric Society*, pp. 153-161, Jan. 1979.

Huang et al., "Correcting Sample Selection Bias by Unlabeled Data", *Advances in Neural Information Processing Systems*, vol. 19, 2007, 8 pages.

Japkowicz et al., "The Class Imbalance Problem: A Systematic Study", Intelligent Data Analysis, vol. 6 (5), pp. 429-449, 2002.

Jiang, "A Literature Survey on Domain Adaptation of Statistical Classifiers", 20 pages, 2007.

Jiang et al., "Instance Weighting for Domain Adaptation in NLP", In *Proceedings of the 45th Annual Meeting of the Association for Computational Linguistics* (ACL'07), Prague, Czech Republic, pp. 264-271, Jun. 2007.

Joachims, Thorsten, "Transductive Inference for Text Classification Using Support Vector Machines", In *Proceedings of the 16th International Conference on Machine Learning*, 1999, 10 pages.

Lawrence et al., "Learning to Learn with the Informative Vector Machine", In *Proceedings of the 21st International Conference on Machine Learning*, ACM, Banff, Canada, pp. 489-496, 2004.

Lee et al., "Learning a Meta-Level Prior for Feature Relevance From Multiple Related Tasks", In *Proceedings of the 24th International Conference on Machine Learning*, ACM, Corvallis, OR, pp. 489-496, 2007.

Liao et al., "Logistic Regression with an Auxiliary Data Source", In *Proceedings of the 22nd International Conference on Machine Learning*, vol. 22, 8 pages, 2005.

Ling et al., "Spectral Domain-Transfer Learning", *KDD '08: Proceeding of the 14th ACM SIGKDD International Conference on Knowledge Discovery and Data Mining*, ACM, Las Vegas, NV, pp. 488-496, Aug. 24-27, 2008.

Luo et al., "Transfer Learning from Multiple Source Domains via Consensus Regularization", In *CIKM '08: Proceeding of the 17th ACM Conference on Information and Knowledge Management*, pp. 103-112, ACM, Napa Valley, CA, Oct. 26-30, 2008.

Mihalkova et al., "Mapping and Revising Markov Logic Networks for transfer Learning", In *Proceedings of the National Conference on Artificial Intelligence (AAAI-07)*, vol. 22, pp. 608-614, Vancouver, Canada, Jul. 2007.

Mihalkova et al., "Transfer Learning by Mapping with Minimal Target Data", In *Proceedings of the AAAI-08 Workshop on Transfer Learning for Complex Tasks*, Chicago, IL, Jul. 2008, 6 pages.

Nigam et al., "Text Classification From Labeled and Unlabeled Documents Using EM", *Machine Learning*, 39(2):34 pages, 2000.

Pan et al., "A Survey on Transfer Learning, Technical Report HKUST-CS08-08", Department of Computer Science and Engineering, Hong Kong University of Science and Technology, Hong Kong, China, Nov. 2008, 26 pages.

Raina et al., "Self-Taught Learning: Transfer Learning from Unlabeled Data", In *Proceedings of the 24th International Conference on Machine Learning*, pp. 759-766, ACM, Corvallis, OR, 2007.

Schwaighofer et al., "Learning Gaussian Process Kernels via Hierarchical Bayes", *Advance in Neural Information Processing Systems*, 17:1209-1216, 2005.

Schweikert et al., "An Empirical Analysis of Domain Adaptation Algorithms for Genomic Sequence Analysis", In *NIPS*, pp. 1433-1440, 2008.

Shimodaira, H., "Improving Predictive Inference Under Covariate Shift by Weighting the Log-Likelihood Function", *Journal of Statistical Planning and Inference*, 90(2):227-244, 18 pages, 2000.

Sugiyama et al., "Direct Importance Estimation with Model Selection and its Application to Covariate Shift Adaptation", *Advances in Neural Information Processing Systems*, 20, 2008, 8 pages.

Zheng et al., "A Regression Framework for Learning Ranking Functions Using Relative Relevance Judgments", In *SIGIR '07: Proceedings of the 30th Annual International ACM SIGIR Conference on Research and Development in Information Retrieval*, pp. 287-294, Amsterdam, The Netherlands, Jul. 23-27, 2007.

Zhu, X., "Semi-Supervised Learning Literature Survey", *Computer Science, University of Wisconsin-Madison*, 60 pages, 2006, last modified Jul. 19, 2008.

\* cited by examiner

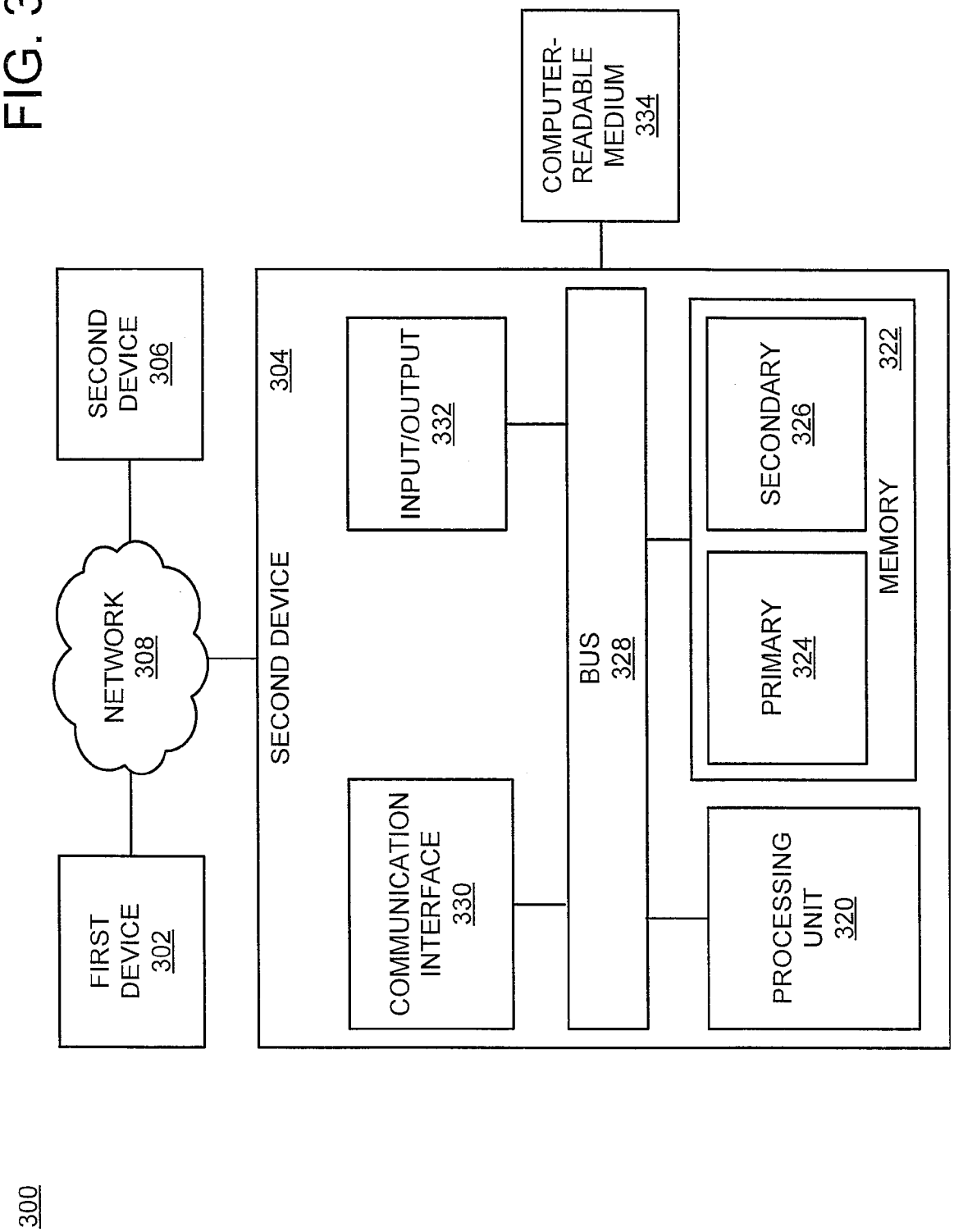

SYSTEM AND METHOD FOR CROSS DOMAIN LEARNING FOR DATA AUGMENTATION

BACKGROUND

1. Technical Field

The subject matter disclosed herein relates to cross domain learning for data augmentation.

2. Description of the Related Art

Supervised machine learning algorithms rely on the availability of high quality training sets consisting of large numbers of examples or data having associated labels. Here, the term "labels" refers to both class labels for classification tasks and real-valued estimates for regression tasks.

For example, in learning to rank search results, a learner may be provided with relevance judgments for a set of query document pairs. In this case, the relevance judgments may indicate, for example, that the query document pairs are "very relevant," "somewhat relevant," or "not relevant." In this example, these relevance judgments constitute a set of class labels for a classification task. In an example of a regression task, a label may consist of a real-valued number that constitutes an estimation of the conditional expectation of a dependent variable given fixed independent variables.

In most supervised machine learning algorithms, a learner is provided with some solved cases (examples with corresponding labels), and based on these solved cases, the learner is supposed to learn how to solve new cases, or more particularly, to learn how to accurately predict labels for new examples. However, because labels for training sets are usually provided by human experts, obtaining the training set may be quite expensive and time consuming. Furthermore, there may not be enough resources and human experts for a particular domain to create high quality, sufficiently large training data sets for that domain.

For purposes of this disclosure, the term "domain" is defined as a data distribution, p(x). Domains may include, but are not limited to, collections of information that are related by at least one common physical, political, geographic, economic, cultural, recreational, academic, or theological trait. Some non-limiting examples of domains include, for instance, the domain of published scientific journal articles, the domain of published business journal articles, the domain of web sites published in the Chinese language, or the domain of web sites having a particular country identifier or a group of country identifiers (e.g., .com, .in, .hk, .uk, .us, etc.)

BRIEF DESCRIPTION OF THE FIGURES

Non-limiting and non-exhaustive embodiments will be described with reference to the following figures, wherein like reference numerals refer to like parts throughout the various figures unless otherwise specified.

FIG. 3 is a schematic diagram illustrating an embodiment of a special purpose computing system that may include one or more devices configurable to execute all or a portion of the processes illustrated in FIGS. 1 and 2.

DETAILED DESCRIPTION

Figure 1:
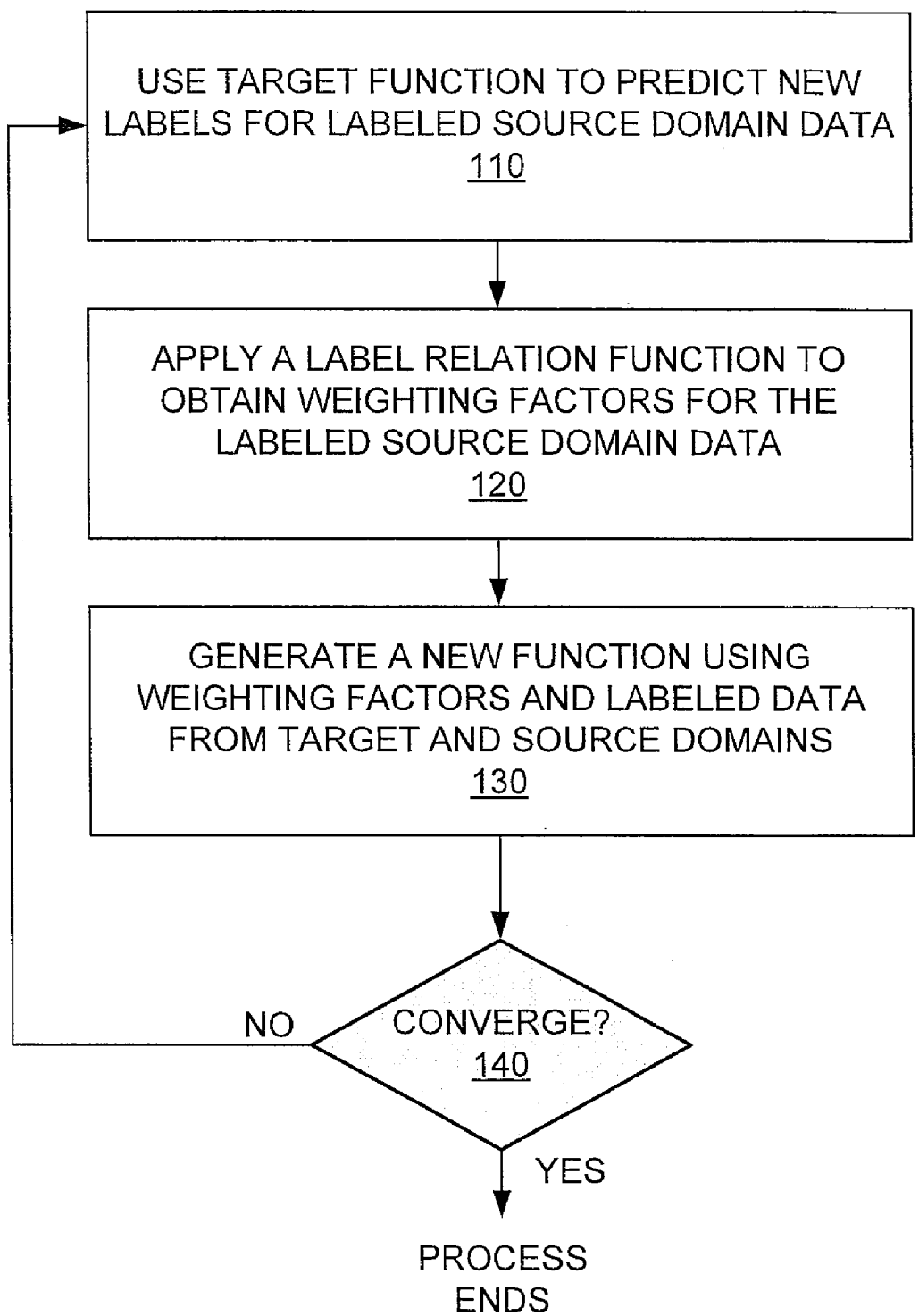
FIG. 1 is a flowchart illustrating a method for one-sided cross-domain learning according to example embodiments.

Frequently, large amounts of high-quality training data may exist for an application in a particular domain. For purposes of this disclosure, a domain having relatively large amounts of high-quality training data may be referred to as a source domain. On the other hand, high-quality training data may be relatively scarce for the same application in another domain. For purposes of this disclosure, a domain that has relatively little high-quality training data may be referred to as a target domain. Here, the term "application" refers to any data analysis task that is performed by a special purpose computing apparatus. High-quality training data for a source domain may be highly valuable if it could be used in a target domain for the same application. For instance, if relevance judgments in the English language could be used to train a model for other language(s), the scarcity of existing training data for those other languages may be overcome. However, this is merely an example of how training data from a source domain may be applied to a target domain and claimed subject matter is not limited in this respect.

Similar situations arise in various other important applications where it is desired to overcome the scarcity of high-quality training data in a target domain by utilizing data from related source domains. In text mining applications, such as text classification, tagging, and name entity recognition, plenty of labeled data from popular source domains such as a business journal domain may be used to help target domains such as a scientific publication domain that has relatively little labeled data. In recommendation system applications, one might use review data from a source domain such as a book domain to help predict the rating of production of a target domain such as a DVD domain. For email spam detection applications, there may be sufficient labeled data for general spam detection (source domain), but not enough labeled data for a specific group of users (target domain). It would be desirable to use the general spam detection data to help build a personalized spam detection model for the group of users.

Domain adaptation refers to a goal of using data from a source domain to train models for a target domain. A challenge of domain adaptation is how to handle different data distributions among domains. For example, the data of a source domain may exhibit a normal, or bell-shaped distribution, while the data of a target domain may exhibit an entirely different distribution altogether. As used herein, data distribution refers to a probability distribution that identifies either the probability of an unidentified random variable (when the variable is discrete) or the probability of the value falling within a particular interval (when the variable is continuous).

Because different domains may exhibit different data distributions, a model that has been trained with data from a single source domain or data from multiple combined source domains usually does not work well for the target domain. This is because it violates the basic supervised learning assumption—that identical data distributions exist for both the source domain data and the target domain data.

An intuitive solution to this domain adaptation problem explicitly relates the data distribution of a source domain to a target domain and then uses this relation to adapt the model from the source domain to the target domain. However, there are three large challenges that are associated with directly relating the data distribution of one domain to another. First, in the real world, differences between data distributions are very difficult to measure and formulate. For high dimensional data such as text data, web data, and image data, it is very difficult to formulate a data distribution in a single domain, let alone relate data distributions among multiple domains.

Second, even if a relationship between a data distribution in a single source domain and a data distribution in a single target domain may be formulated, that formulation may not be efficiently extended to multiple source domains. This is because different source domains may differ from the target domain in different ways. Third, a relationship between data distributions is usually tied to the particular data distributions and hence, the algorithm design for domain adaptation may often remain heavily domain-specific, application-specific, and learning-task-specific.

Machine-learning algorithms according to example embodiments may take an approach that differs from the one described above. Example embodiments may assume that hypothesis functions exist for both the target and source domains. More generally, example embodiments may assume that a hypothesis function exists for at least two domains. For purposes of this disclosure, a hypothesis function is a function that, when given an input data instance from their respective domain, provides a label for the given input data instance. Example embodiments may further assume that a hypothesis function in one domain may be related to a hypothesis function in another domain.

In a typical domain adaptation problem, it is desired to know a hypothesis function for a target domain in order to accurately estimate labels for data in the target domain. Instead of directly formulating a relationship between a data distribution in the source domain and a data distribution in the target domain, example embodiments may formulate a label relation function. In other words, rather than attempting to relate, in the input space, a data distribution in one domain to a data distribution in another domain, example embodiments may use the label relation function to relate, in the output space, the label in one domain to a label in another domain. For purposes of this disclosure, a label relation function may comprise any function that gives a measure of the consistence between two labels. A label relation function may therefore give an indication of whether an output of a hypothesis function in one domain is relevant to an output of a hypothesis function (or true labels provided by human experts) in another domain.

According to example embodiments, the label relation function may indicate that a label obtained from a hypothesis function in one domain is highly consistent with a label obtained from a hypothesis function in another domain. If so, the labeled data from the one domain may be used to augment the labeled training data in the other domain.

To describe a particular example in accordance with an example embodiment, let us return to one of the specific domain adaptation situations described above, the case of email spam detection. For email spam detection applications, there may be sufficient labeled data for general spam detection (source domain), but not enough labeled data for a specific group of users (target domain). It would be desirable to use the general spam detection data to help build a personalized spam detection model for the group of users. However, before this can be done it should be determined which instances of the general spam detection data may safely be used.

According to this particular embodiment, the labels for the source domain data may simply be class labels such as "spam" or "not spam." According to this particular embodiment of domain adaptation for email spam detection, the hypothesis function for the target domain may be used to predict labels for labeled data in the source domain. That is, the labeled source domain data may be used as input for the target domain hypothesis function, and the output of the target domain hypothesis function may be predicted labels for the source domain data. According to this particular embodiment, the predicted labels may also be class labels such as "spam" or "not spam." Thus, according to this embodiment there now may be two sets of labels for the source domain data—the original labels and the predicted labels obtained from application of the target domain hypothesis function.

According to this particular embodiment, a label relation function is then applied to the original labels for the source domain data and the predicted labels for the source domain data. In this simple example, since the class labels for the source domain data are either "spam" or "not spam," it is evident that if an original label for the source domain data and its corresponding predicted label are both "spam" or both "not spam," then the two labels are consistent. If the original label and the corresponding predicted label are "spam" and "not spam," then the two labels are not consistent.

In this particular case, the applied label relation function produces a binary output, the labels are either consistent or they are not. One may alternatively describe the applied label relation function as producing weighting factors for the labeled source domain data, where a weighting factor of zero (0) is assigned to the source domain data when the labels are not consistent, or where a weighting factor of one (1) is assigned to the source domain data when the labels are consistent.

The use of either zero or one for weighting factors is just one special case that was chosen for ease of illustration, claimed subject matter is not so limited. Generally speaking, the weighting factors obtained through application of the label relation function may be any real value. However, in some preferred embodiments the weighting factors (wf) may range between zero and one, or $0 \leq wf \leq 1$.

According to the example embodiment, weighting factors are now associated with the labeled source domain data through application of the label relation function. The labeled source domain data having a weighting factor of one may be used to augment the labeled data from the target domain, and with this additional labeled data a better estimation of the hypothesis function for the target domain may be obtained.

FIG. 1 is a flowchart illustrating a generalized method 100 for one-sided cross-domain learning according to example embodiments. First, assume that there exists a target domain having relatively little labeled data and a source domain having a relatively large amount of high-quality labeled data. Several specific real-world examples of this particular situation were described above. Further assume that there exists both a hypothesis function for the target domain and a hypothesis function for the source domain, and further that the outputs of the target function and source function may be related using a label relation function. The hypothesis functions for the target and source domains may be referred to as the target function and the source function, respectively.

Referring to FIG. 1, method 100 begins with process 110, where an initial target function is used to obtain a set of predicted labels for labeled source domain data. In other words, the initial target function is used to generate predicted labels for source domain data, which, as mentioned above, may already have a relatively large amount of high-quality labeled data. Presumably, the source function may already be well-characterized because of the relatively large number of labels that exist for the source domain data.

According to example embodiments, an initial target function may be obtained through informed estimation, using whatever labels that exist for the target domain data. According to other example embodiments, the initial target function may simply be an arbitrary function that is provided from an outside source. Although an initial target function may not accurately predict labels for unlabeled data in the target domain, according to example embodiments the target function may be improved through an iterative process of using labels from source domain data.

Next, in process 120, a label relation function is applied to the predicted labels obtained by using the target function on the labeled source domain data and the original labels associated with the labeled source domain data. Through application of a label relation function, weighting factors may be obtained for labeled source domain data. Such weighting factors may provide an indication as to how consistent the predicted labels for the labeled source domain data (obtained using the initial target function) are to the original labels for the labeled source domain data (obtained using the source function). More on label relation functions is disclosed below.

Next, in process 130, weighting factors obtained from process 120 and labeled data from both target and source domains are used to "train," or modify, an initial target function and generate a new target function. Because weighting factors provide an indication of how closely examples from the source domain are related to the target domain, the most consistent examples may then be used to augment labeled data for the target domain, thereby improving the performance of the target function.

In process 140, the performance of the new target function and the initial target function are compared and checked for convergence. If the performances of the functions converge sufficiently, then the method ends. If not, the method returns to process 110, where the iterative process continues as described above.

The particular method 100 as described above utilized only a single source domain to augment the model in a target domain. More generally, however, the principles described above may be extended to augment target domain data with data from multiple source domains. The use of labeled source domain data from one or more source domains to help improve the performance of a model for a target domain may be referred to as one-sided cross-domain learning.

According to other example embodiments, the principles described above may be extended so that data from a first domain is used to augment data in a second domain, and conversely, data in the second domain is used to augment data in the first domain. This cross-utilization of examples from two domains to augment data in both domains may be referred to as two-sided cross-domain learning, and will be explained in greater detail below.

At this point, further details regarding the concept of a label relation function are presented in conjunction with a discussion on notation and some theoretical underpinnings. First, with regards to notation, let R denote the set of real numbers, R+ denote the set of nonnegative real numbers, and R++ denote the set of positive real numbers. X may denote input space and Y may denote output space. In the most general case for both classification tasks and regression tasks, X and Y are both considered to be R, the set of real numbers.

Let $h: X \rightarrow Y$ denote the hypothesis function that is desired to be known and let H denote a function space. The target function $h^t$ and source function $h^s$ denote the hypothesis functions we want to learn from the target and source domains, respectively. [A domain is defined as a data distribution D on the input space X.] $D^t$ and $D^s$ denote the target and source domains, respectively. $S^t = \{(x^t_j, Y^t_j)\}_{i=1}^n \epsilon X \times Y \approx D^t$ denotes the training data sampled from the target domain, while $S^t = \{(x^t_j, Y^t_j)\}_{i=1}^n \epsilon X \times Y \approx D^t$ denotes the training data sampled from the source domain. Let $l: Y \times Y \rightarrow R$ be a loss function that is defined on a pair of outputs.

Suppose that we only have $S^t$, or training data sampled from the target domain. A learning algorithm may take $S^t$ as input to learn the function, $h^t$, which is our optimal solution to minimize a risk function $R: Y \times Y \rightarrow R_+$, $R^t = E_{x \sim D_t}[l(h^t(x), y)] = \int l$ $(h^t(x), y) dF^t(x, y)$, where $F^t(x, y)$ denotes the cumulative density function of $(x, y)$ on the target domain.

Risk function $R^t$ may not be minimized directly, since $F^t(x, y)$ is unknown. Instead, based on the training data, an empirical risk function $$\tilde{R}^t = \frac{1}{n} \sum_{i=1}^n l(h^t(x^t_i), y^t_i)$$

is minimized. But, if the training data sample size (n) is small, the empirical risk $\tilde{R}^t$ may not be a good approximation for the true risk $R^t$, and one may not expect to obtain a suitable estimate of the target function $h^t$.

According to example embodiments, additional training data from a source domain $S^s$ or multiple source domains $S^{s1}$, $S^{s2}$, etc. may be used to augment the training data from the target domain $S^t$, with the goal being to use $S^s$ to help learn the target function $h^t$. Because the data distributions of the source domain $D^s$ and the target domain $D^t$ may be different, simply combining $S^t$ and $S^s$ may not be a justified approach. As discussed above, it may be difficult to formulate the difference between $D^s$ and $D^t$, especially when $X = R^d$ with large d.

Rather than combining $S^t$ and $S^s$, example embodiments take advantage of several facts and properties of the output space Y. First, a relation between a pair of outputs is much easier to formulate, because in most cases the output space is single dimension, i.e., $Y \in R$. Second, the relation between the outputs of $h^t$ and $h^s$ is usually intuitive and implies the basic feasibility for domain adaptation in most applications. For example, in the ranking problem, $h^t$ and $h^s$ may be the optimal ranking functions for the target domain $D^t$ (query-document distribution for a country) and the source domain $D^s$ (query-document distribution for another country). Given any query-document instance x from $D^s$, we obtain two ranking scores $y^t = h^t(x)$ and $y^s = h^s(x)$. We expect a certain correlation between $y^t$ and $y^s$, for example, $y^t$ and $y^s$ are positively correlated with a significant probability. If $y^t$ is sufficiently independent from $y^s$, which implies that the two domain have totally different ranking principles, we cannot expect that the training data form $S^s$ can help us learn $h^t$. For example, the optimal ranking function $h^s$ from the source domain cannot give anything more than a random guess for the instances from the target domain. Similarly, in sentimental classification, we expect that the output of the rating function $h^s$ in a book (source) domain is correlated with the output of the ranking function $h^t$ in a DVD (target) domain in a certain way, otherwise the training data from the book domain may not be helpful in the DVD domain.

Therefore, example embodiments utilize a label relation function, $r: Y \times Y \rightarrow R$ to formulate the relation between two labels (outputs) such that $r(y^t, y^s)$ measures a "consistence" between $y^t$ and $y^s$. The label relation function itself may be selected from among many suitable functions. For example, according to a particular embodiment an exponential function may be selected as a label relation function such that $r(y^t, y^s) = \alpha \exp(d(y^t, y^s))$, where $\alpha \in R_{++}$ is a positive constant, and $d: Y \times Y \rightarrow R_+$ is a distance function. An exponential function may be a good choice for a label relation function for several reasons. First, such an exponential function may provide an intuitive measure for the consistence between two labels, since its output is between 0 and 1 with 1 denoting the perfect consistence of two labels. Second, such an exponential function may lead to relatively less computational effort.

According to other example embodiments, a label relation may comprise a binary relation function that is suitable for classification. According to other example embodiments, a label relation function may comprise a L1 none relation function that is robust towards outliers. The L1 norm relation function may be of the form $L1(y^1,y^2)=|y^t-y^2|$, e.g., the absolute difference. According to other example embodiments, a label relation function may comprise a L2 norm relation function that is suitable for regression. The L2 norm relation function may be of the form $L2(y^1,y^2)=|y^1-y^2|^2$, e.g., the squared difference.

According to example embodiments, a new risk minimization framework for domain adaptation is utilized, one which may transfer knowledge from the source domain to the target domain through a label relation function. In implementing example embodiments, certain assumptions are made. First, that the target domain and the source domain have their own optimal hypothesis functions $h^t$ and $h^s$, respectively. Second, that the relation of the outputs of the two hypothesis functions is formulated as $r(h^t,h^s)$.

The output of $h^t$ may be called a target label, denoted by $y^t$, while the output of $h^s$ may be called a source label, denoted by $y^s$. In the source domain, for each instance x, the source labels $y^s$ are observable but the target labels $y^t$ are not observable. Treating the target labels $y^t$ for the source domain as hidden variables, the source domain data may be incorporated into the following risk function $$R^a = E[l(h^t(x^t), y^t)] + E[\alpha l(h^t(x^s), y^t)r(y^t, y^s)]$$
$$= \int l(h^t(x^t), y^t) dF^t(x^t, y^t) + \int \alpha l(h^t(x^s), y^t)r(y^t, y^s) dF^s(x^t, y^s, y^t)$$

In the framework of the above equation, by introducing the hidden target label $y^t$ and the label relation function r into the source domain, the additional information from source domain data $S^s$ may be used to learn the target function $h^t$. In the above equation, since $F^t(x^t,y^t)$ and $F^s(x^t,y^s,y^t)$ are unknown, example embodiments reduce the following empirical risk minimization formula to learn the target function $h^t$.

$$\tilde{R}^a = \frac{1}{n}\sum_{i=1}^{n} l(h^t(x^t_i), y^t_i) + \frac{\alpha}{m}\sum_{j=n+1}^{m} l(h^t(x^s_j), y^t_j)r(y^t_j, y^s_j)$$

The above equation is helpful for intuitively understanding the example embodiments. Example embodiments may select instances from the source domain according to their usefulness in order to iteratively develop the target function $h^t$. According to example embodiments, the usefulness of the source domain data may be measured by a suitable label relation function, as explained above. According to example embodiments, by using the label relation function in output space, it is possible to iteratively develop the target function $h^t$ without explicitly formulating the data distribution difference between source and target domains in input space.

In the detailed description above, a label relation function and a method for one-sided cross-domain learning according to some example embodiments were described. In other example embodiments, similar principles may be used to perform a two-sided cross-domain learning process, which refers to a situation where data from each of the two domains are both utilized to augment the data in the other one of the domains.

Figure 2:
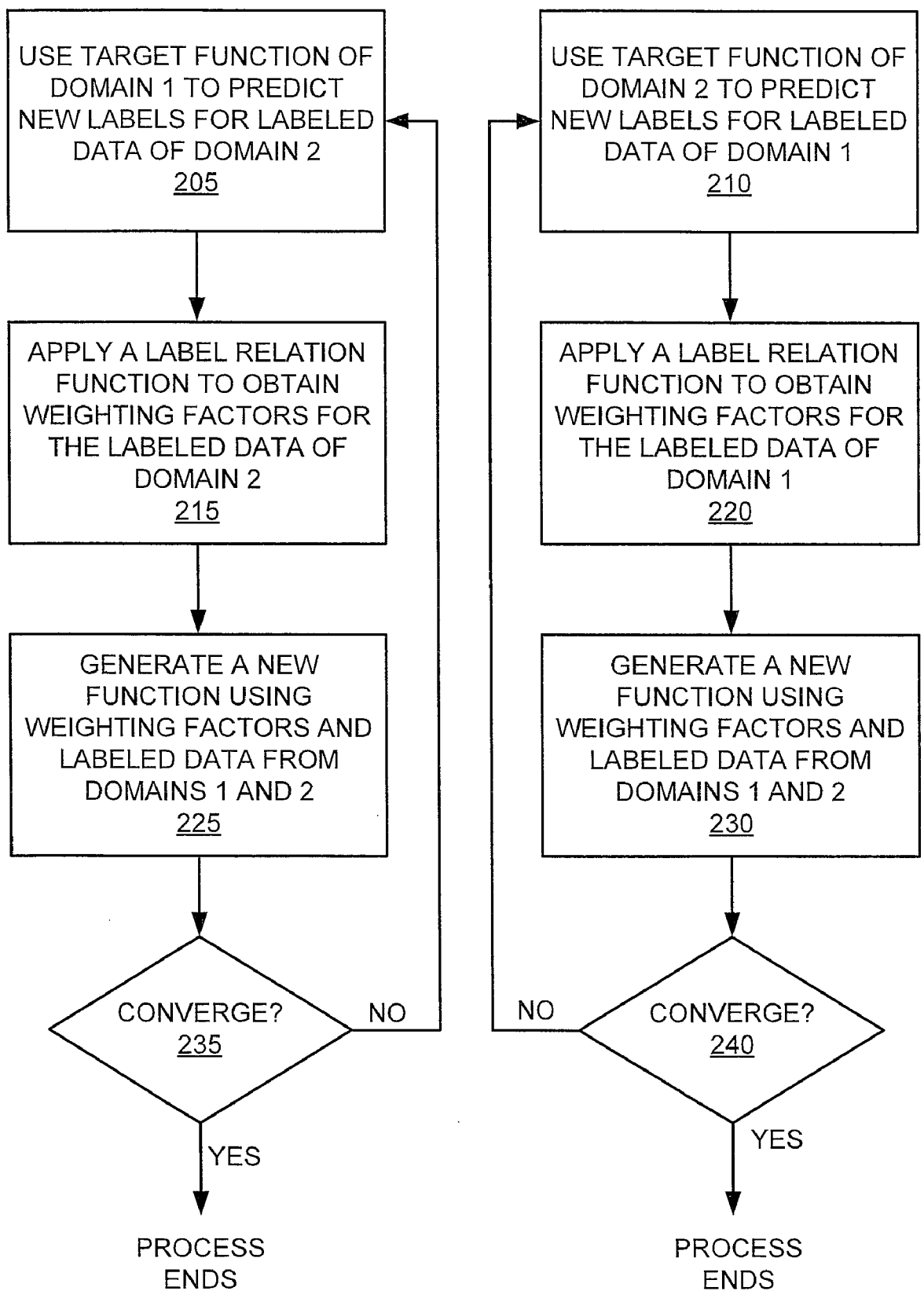
FIG. 2 is a flowchart illustrating a method for two-sided cross-domain learning according to example embodiments.

FIG. 2 is a flowchart illustrating a method 200 for two-sided cross-domain learning according to example embodiments. Comparing FIG. 1 and FIG. 2, it will be noticed that method 200 includes two distinct process streams, one process stream including the processes 205, 215, 225, and 235, and the other process stream including the processes 210, 220, 230, and 240. Each of these process streams is very similar to the process stream illustrated in FIG. 1. In the method 200, the situation is addressed where two domains exist, but unlike the scenario of method 100, the target function for the first domain and the second domain are well characterized.

In this scenario, data from both the first and second domains is utilized to augment training data in the other domain. Like method 100, method 200 may utilize a label relation function to identify outputs from one domain that is consistent with outputs from another, and uses these identified instances to iteratively develop the target functions of both domains. Aside from this difference, the processes illustrated for method 200 are substantially similar to those described above for method 100, and so will not be repeated here. Also note that FIG. 2 illustrates that the two process streams are substantially independent of one another, which should not be taken to suggest that the two process streams may not be executed concurrently or simultaneously.

Additionally, in accordance with other example embodiments, concepts illustrated in methods 100 and 200 may be extended to encompass more than two domains. For example, in the most general case a label relation function may be formulated between a first domain and one or more other domains. Then, any training data that exists in the one or more other domains may be utilized to augment the training data in the first domain. When embodiments exist that involve more than two domains, cross-domain learning may either be one-sided as described above for method 100, two-sided as described above for method 200, or a combination of both, depending on the individual relationship between every domain.

FIG. 3 is a schematic diagram illustrating an example embodiment of a special purpose computing system 300 that may include one or more devices configurable to execute all or a portion of a cross-domain learning process using one or more techniques illustrated above, for example. In a particular example, although claimed subject matter is not limited in this respect, such a cross-domain learning process may be implemented to process queries or requests that are received from devices coupled to network 308. System 300 may include, for example, a first device 302, a second device 304 and a third device 306, which may be operatively coupled together through the network 308.

In a particular example embodiment, the functionality illustrated in the flowchart of FIG. 1 or FIG. 2 may be centrally implemented by the processing unit 320 of the secondary device 304 by executing instructions stored in the primary memory 324. According to other embodiments, the functionality illustrated in the flowchart of FIG. 1 or FIG. 2 may be distributed across multiple ones of the first, second, and third devices 302, 304, and 306 that are linked by the network 308. These examples are presented for purposes of illustration and not for limitation, thus the claimed subject matter is not so limited.

First device 302, second device 304 and third device 302, as shown in FIG. 3, may be representative of any device, appliance or machine that may be configurable to exchange data over network 308. By way of example but not limitation, any of first device 302, second device 304, or third device 302 may include: one or more computing devices and/or platforms, such as, e.g., a desktop computer, a laptop computer, a workstation, a server device, or the like; one or more personal computing or communication devices or appliances, such as, e.g., a personal digital assistant, mobile communication device, or the like; a computing system and/or associated service provider capability, such as, e.g., a database or data storage service provider/system, a network service provider/system, an Internet or intranet service provider/system, a portal and/or search engine service provider/system, a wireless communication service provider/system; and/or any combination thereof.

Similarly, network 308, as shown in FIG. 3, is representative of one or more communication links, processes, and/or resources configurable to support the exchange of data between at least two of first device 302, second device 304, and third device 306. By way of example but not limitation, network 308 may include wireless and/or wired communication links, telephone or telecommunications systems, data buses or channels, optical fibers, terrestrial or satellite resources, local area networks, wide area networks, intranets, the Internet, routers or switches, and the like, or any combination thereof.

As illustrated, for example, by the dashed lined box illustrated as being partially obscured of third device 306, there may be additional like devices operatively coupled to network 308.

It is recognized that all or part of the various devices and networks shown in system 300, and the processes and methods as further described herein, may be implemented using or otherwise include hardware, firmware, software, or any combination thereof.

Thus, by way of example but not limitation, second device 304 may include at least one processing unit 320 that is operatively coupled to a memory 322 through a bus 328.

Processing unit 320 is representative of one or more circuits configurable to perform at least a portion of a data computing procedure or process. By way of example but not limitation, processing unit 320 may include one or more processors, controllers, microprocessors, microcontrollers, application specific integrated circuits, digital signal processors, programmable logic devices, field programmable gate arrays, and the like, or any combination thereof.

Memory 322 is representative of any data storage mechanism. Memory 322 may include, for example, a primary memory 324 and/or a secondary memory 326. Primary memory 324 may include, for example, a random access memory, read only memory, etc. While illustrated in this example as being separate from processing unit 320, it should be understood that all or part of primary memory 324 may be provided within or otherwise co-located/coupled with processing unit 320.

Secondary memory 326 may include, for example, the same or similar type of memory as primary memory and/or one or more data storage devices or systems, such as, for example, a disk drive, an optical disc drive, a tape drive, a solid state memory drive, etc. In certain implementations, secondary memory 326 may be operatively receptive of, or otherwise configurable to couple to, a computer-readable medium 334. Computer-readable medium 334 may include, for example, any medium that can carry and/or make accessible data, code and/or instructions for one or more of the devices in system 300.

Second device 304 may include, for example, a communication interface 330 that provides for or otherwise supports the operative coupling of second device 304 to at least network 308. By way of example but not limitation, communication interface 330 may include a network interface device or card, a modem, a router, a switch, a transceiver, and the like.

Second device 304 may include, for example, an input/output 332. Input/output 332 is representative of one or more devices or features that may be configurable to accept or otherwise introduce human and/or machine inputs, and/or one or more devices or features that may be configurable to deliver or otherwise provide for human and/or machine outputs. By way of example but not limitation, input/output device 332 may include an operatively configured display, speaker, keyboard, mouse, trackball, touch screen, data port, etc.

It should also be understood that, although particular embodiments have just been described, the claimed subject matter is not limited in scope to a particular embodiment or implementation. For example, one embodiment may be in hardware, such as implemented to operate on a device or combination of devices, for example, whereas another embodiment may be in software. Likewise, an embodiment may be implemented in firmware, or as any combination of hardware, software, and/or firmware, for example. Such software and/or firmware may be expressed as machine-readable instructions which are executable by a processor. Likewise, although the claimed subject matter is not limited in scope in this respect, one embodiment may comprise one or more articles, such as a storage medium or storage media. This storage media, such as one or more CD-ROMs and/or disks, for example, may have stored thereon instructions, that when executed by a system, such as a computer system, computing platform, or other system, for example, may result in an embodiment of a method in accordance with the claimed subject matter being executed, such as one of the embodiments previously described, for example. As one potential example, a computing platform may include one or more processing units or processors, one or more input/output devices, such as a display, a keyboard and/or a mouse, and/or one or more memories, such as static random access memory, dynamic random access memory, flash memory, and/or a hard drive, although, again, the claimed subject matter is not limited in scope to this example.

In the detailed description presented above, numerous specific details are set forth to provide a thorough understanding of the claimed subject matter. However, it will be understood by those skilled in the art that the claimed subject matter may be practiced without these specific details. In other instances, well-known methods, procedures, components and/or circuits have not been described in detail so as not to obscure the claimed subject matter.

Some portions of the above detailed description were presented in terms of algorithms and/or symbolic representations of operations on data bits or binary digital signals stored within a computing system memory, such as a computer memory. These algorithmic descriptions and/or representations are the techniques used by those of ordinary skill in the data processing arts to convey the substance of their work to others skilled in the art. An algorithm is here, and generally, considered to be a self-consistent sequence of operations and/or similar processing leading to a desired result. The operations and/or processing involve physical manipulations of physical quantities. Typically, although not necessarily, these quantities may take the form of electrical and/or magnetic signals capable of being stored, transferred, combined, compared and/or otherwise manipulated.

For example, one or more portions of a memory device may store signals representative of data and/or information as expressed by a particular state of the memory device. In an implementation, an electronic signal representative of data and/or information may be "stored" in a portion of a memory device by affecting or changing the state of such portions of the memory device to represent data and/or information as binary information (e.g., ones and zeros). As such, in a particular implementation, such a change of state of the portion of memory to store a signal representative of data and/or information constitutes a transformation of a memory device to a different state or thing.

It has proven convenient at times, principally for reasons of common usage, to refer to these signals as bits, data, values, elements, symbols, characters, terms, numbers, numerals and/or the like. It should be understood, however, that all of these and similar terms are to be associated with the appropriate physical quantities and are merely convenient labels. Unless specifically stated otherwise, as apparent from the foregoing discussion, it is appreciated that throughout this specification discussions utilizing terms such as "processing," "computing," "calculating," "associating," "identifying," "determining," "allocating," "generating," and/or the like refer to the actions and/or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

The terms, "and," "and/or," and "or" as used herein may include a variety of meanings that will depend at least in part upon the context in which it is used. Typically, "and/or" as well as "or" if used to associate a list, such as A, B and/or C, is intended to mean A, B, and C, here used in the inclusive sense, as well as A, B or C, here used in the exclusive sense. Reference throughout this specification to "one embodiment" or "an embodiment" means that a particular feature, structure, or characteristic described in connection with the embodiment is included in at least one embodiment of claimed subject matter. Thus, the appearances of the phrase "in one embodiment" or "an embodiment" in various places throughout this specification are not necessarily all referring to the same embodiment. Furthermore, the particular features, structures, or characteristics may be combined in one or more embodiments. Embodiments described herein may include machines, devices, engines, or apparatuses that operate using digital signals. Such signals may comprise electronic signals, optical signals, electromagnetic signals, or any form of energy that provides information between locations.

While there have been illustrated and described what are presently considered to be example embodiments, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular embodiments disclosed, but that such claimed subject matter may also include all embodiments falling within the scope of the appended claims, and equivalents thereof.

What is claimed is:

1. A method comprising, with a special purpose computing apparatus:

for data from a first domain, the first domain data having a plurality of original labels, generating a first plurality of signals using a hypothesis function for a second domain, the hypothesis function determined by using a plurality of labels that are associated with data from a second domain, the first plurality of signals representative of a plurality of first predicted labels for the first domain data;

applying a label relation function to the first plurality of signals representative of the first predicted labels for the first domain data and the original labels for the first domain data to generate a second plurality of signals, the second plurality of signals representative of a plurality of weighting factors for the first domain data;

generating a new hypothesis function for the second domain using the second domain data, the first domain data, and the weighting factors for the first domain data;

evaluating a performance of the new hypothesis function for the second domain to determine if there is a convergence;

for data from the second domain, the second domain data having a plurality of original labels, generating a third plurality of signals using a hypothesis function for the first domain, the hypothesis function determined by using a plurality of labels that are associated with data from the first domain, the third plurality of signals representative of a plurality of first predicted labels for the second domain data;

applying another label relation function to the first predicted labels for the second domain data and the original labels for the second domain data to determine a plurality of weighting factors for the second domain data;

generating a new hypothesis function for the first domain using the first domain data, the second domain data, and the weighting factors for the second domain data; and evaluating a performance of the new hypothesis function for the first domain to determine if there is a convergence.

2. The method of claim 1, further comprising, with the special purpose computing apparatus generating a fourth plurality of signals using the new hypothesis function for the second domain, the fourth plurality of signals representative of a plurality of second predicted labels for the labeled first domain data.

3. The method of claim 2, further comprising, with the special purpose computing apparatus applying the label relation function to the second predicted labels for the first domain data and the original labels for the first domain data to determine a plurality of second weighting factors for the labeled first domain data.

4. The method of claim 2, wherein the new hypothesis function for the second domain is associated with a ranking of a result of a query in decreasing order of relevance.

5. The method of claim 2, wherein the new hypothesis function for the second domain is associated with evaluating whether an arbitrary email is representative of a spam email.

6. The method of claim 2, wherein the new hypothesis function for the second domain is associated with suggesting a spelling corrected version of a requested query.

7. The method of claim 1, further comprising, with the special purpose computing apparatus generating a fourth plurality of signals using the new hypothesis function for the first domain, the fourth plurality of signals representative of a plurality of second predicted labels for the second domain data.

8. A special purpose computing apparatus comprising:
a memory; and
a processor to:
for data from a first domain, the first domain data having a plurality of original labels, generate a first plurality of signals using a hypothesis function for a second domain, the hypothesis function determined by using a plurality of labels that are associated with data from a second domain, the first plurality of signals representative of a plurality of first predicted labels for the first domain data;
apply a label relation function to the first plurality of signals representative of the first predicted labels for the first domain data and the original labels for the first domain data to generate a second plurality of signals, the second plurality of signals representative of a plurality of weighting factors for the first domain data;
generate a new hypothesis function for the second domain using the second domain data, the first domain data, and the weighting factors for the first domain data;
evaluate a performance of the new hypothesis function for the second domain to determine if there is a convergence;
for data from the second domain, the second domain data having a plurality of original labels, generate a third plurality of signals using a hypothesis function for the first domain, the hypothesis function determined by using a plurality of labels that are associated with data from the first domain, the third plurality of signals representative of a plurality of first predicted labels for the second domain data;
apply another label relation function to the first predicted labels for the second domain data and the original labels for the second domain data to determine a plurality of weighting factors for the second domain data;
generate a new hypothesis function for the first domain using the first domain data, the second domain data, and the weighting factors for the second domain data; and
evaluate a performance of the new hypothesis function for the first domain to determine if there is a convergence.

9. The special purpose computing apparatus of claim 8, the processor to further generate a fourth plurality of signals using the new hypothesis function for the second domain, the fourth plurality of signals representative of a plurality of second predicted labels for the labeled first domain data.

10. The special purpose computing apparatus of claim 9, the processor to further apply the label relation function to the second predicted labels for the first domain data and the original labels for the first domain data to determine a plurality of second weighting factors for the labeled first domain data.

11. The special purpose computing apparatus of claim 9, wherein the new hypothesis function for the second domain is associated with a ranking of a result of a query in decreasing order of relevance.

12. The special purpose computing apparatus of claim 9, wherein the new hypothesis function for the second domain is associated with evaluating whether an arbitrary email is representative of a spam email.

13. The special purpose computing apparatus of claim 9, wherein the new hypothesis function for the second domain is associated with suggesting a spelling corrected version of a requested query.

14. The special purpose computing apparatus of claim 8, the processor to further generate a fourth plurality of signals using the new hypothesis function for the first domain, the fourth plurality of signals representative of a plurality of second predicted labels for the second domain data.

15. An article comprising:
a non-transitory machine-readable medium comprising instructions stored thereon which, in response to being executed by a special purpose computing apparatus, direct the special purpose computing apparatus to:
for data from a first domain, the first domain data having a plurality of original labels, generate a first plurality of signals using a hypothesis function for a second domain, the hypothesis function determined by using a plurality of labels that are associated with data from a second domain, the first plurality of signals representative of a plurality of first predicted labels for the first domain data;
apply a label relation function to the first plurality of signals representative of the first predicted labels for the first domain data and the original labels for the first domain data to generate a second plurality of signals, the second plurality of signals representative of a plurality of weighting factors for the first domain data;
generate a new hypothesis function for the second domain using the second domain data, the first domain data, and the weighting factors for the first domain data;
evaluate a performance of the new hypothesis function for the second domain to determine if there is a convergence;
for data from the second domain, the second domain data having a plurality of original labels, generate a third plurality of signals using a hypothesis function for the first domain, the hypothesis function determined by using a plurality of labels that are associated with data from the first domain, the third plurality of signals representative of a plurality of first predicted labels for the second domain data;
apply another label relation function to the first predicted labels for the second domain data and the original labels for the second domain data to determine a plurality of weighting factors for the second domain data;
generate a new hypothesis function for the first domain using the first domain data, the second domain data, and the weighting factors for the second domain data; and
evaluate a performance of the new hypothesis function for the first domain to determine if there is a convergence.

16. The article of claim 15, the instructions stored thereon which, in response to being executed by the special purpose computing apparatus, further direct the special purpose computing apparatus to generate a fourth plurality of signals using the new hypothesis function for the second domain, the fourth plurality of signals representative of a plurality of second predicted labels for the labeled first domain data.

17. The article of claim 16, the instructions stored thereon which, in response to being executed by the special purpose computing apparatus, further direct the special purpose computing apparatus to apply the label relation function to the second predicted labels for the first domain data and the original labels for the first domain data to determine a plurality of second weighting factors for the labeled first domain data.

18. The article of claim 16, wherein the new hypothesis function for the second domain is associated with a ranking of a result of a query in decreasing order of relevance.

19. The article of claim 15, the instructions stored thereon which, in response to being executed by the special purpose computing apparatus, further direct the special purpose computing apparatus to generate a fourth plurality of signals using the new hypothesis function for the first domain, the fourth plurality of signals representative of a plurality of second predicted labels for the second domain data.

* * * * *